United States Patent
Hirota et al.

(10) Patent No.: US 6,243,215 B1
(45) Date of Patent: Jun. 5, 2001

(54) IMAGE MAGNIFYING FRESNEL LENS FOR OBSERVATION OF A ON DISPLAY SCREEN

(75) Inventors: Kashichi Hirota; Junji Fukuda, both of Hachioji; Susumu Seto, Odawara, all of (JP)

(73) Assignee: Kyowa Electric and Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/405,347

(22) Filed: Sep. 24, 1999

(30) Foreign Application Priority Data

Oct. 12, 1998 (JP) ................................................ 10-289418

(51) Int. Cl.$^7$ ...................................................... G02B 3/08
(52) U.S. Cl. ............................................................ 359/742
(58) Field of Search ...................................... 359/742, 743

(56) References Cited

U.S. PATENT DOCUMENTS

| | | | |
|---|---|---|---|
| 3,744,882 | * | 7/1973 | Forster, Jr. ............................ 359/742 |
| 4,775,229 | * | 10/1988 | Ichihara et al. ...................... 359/742 |
| 4,904,069 | * | 2/1990 | Nakata ................................. 359/742 |
| 5,796,520 | * | 8/1998 | Maruyama ........................... 359/743 |

FOREIGN PATENT DOCUMENTS 3 827 834 A1 * 2/1990 (DE) ................................. 359/742
9-258010   10/1997 (JP) .
10-232432   9/1998 (JP) .

* cited by examiner

*Primary Examiner*—Georgia Epps
*Assistant Examiner*—Evelyn A. Lester
(74) *Attorney, Agent, or Firm*—Frishauf, Holtz, Goodman, Langer & Chick, P.C.

(57) ABSTRACT

There is disclosed a Fresnel lens, adapted to be placed in front of a display screen of a computer or a television set in order to magnify images for observation, which does not cause a rainbow-like pattern to appear even when annular prism elements as the constituent elements of said Fresnel lens are arranged at a fine pitch. A spherical surface having a radius of curvature corresponding to the focal distance of the lens formed by said annular prism elements of said Fresnel lens is formed within a circular area defined by a predetermined radius around the optical axis, where the rainbow-like pattern would otherwise appear due to diffraction. The predetermined pitch in arranging a plurality of annular prism elements of the Fresnel lens is equal to or less than 0.25 mm and the height of the annular prism elements in the circular area is equal to or less than 5 $\mu$m and preferably equal to or less than 7 $\mu$m.

5 Claims, 3 Drawing Sheets

FIG. 2 f=500mm

| $h_i$ | $\theta_i$ | p=0.25mm $d_i$ | p=0.2mm $d_i$ | p=0.15mm $d_i$ | p=0.1mm $d_i$ | p=0.05mm $d_i$ |
|---|---|---|---|---|---|---|
| 0.25mm | 3.5′ | 0.25 μ | 0.2 μ | 0.15 μ | 0.1 μ | 0.05 μ |
| 0.5 | 7′ | 0.51 | 0.41 | 0.31 | 0.2 | 0.1 |
| 1.0 | 14′ | 1.0 | 0.8 | 0.6 | 0.41 | 0.2 |
| 5.0 | 1° 10′ | 5.1 | 4.1 | 3.1 | 2.0 | 1.0 |
| 6.25 | 1° 27′ | 6.3 | 5.1 | 3.8 | 2.5 | 1.3 |
| 7.0 | 1° 37′ | 7.1 | 5.6 | 4.2 | 2.8 | 1.4 |
| 8.75 | 2° 02′ | 8.9 | 7.1 | 5.3 | 3.6 | 1.8 |
| 11.5 | 2° 41′ | 11.7 | 9.4 | 7.0 | 4.7 | 2.3 |
| 12.5 | 2° 55′ | 12.7 | 10.0 | 7.6 | 5.1 | 2.5 |
| 17.0 | 3° 57′ | 17.3 | 13.8 | 10.4 | 6.9 | 3.5 |
| 20.0 | 4° 38′ | 20.3 | 16.2 | 12.1 | 8.1 | 4.1 |
| 24.5 | 5° 41′ | 24.9 | 20.0 | 14.9 | 10.0 | 5.0 |
| 35.0 | 8° 06′ | 35.6 | 28.5 | 21.3 | 14.2 | 7.1 |
| 40.0 | 9° 15′ | 40.7 | 32.6 | 24.4 | 16.3 | 8.1 |

IMAGE MAGNIFYING FRESNEL LENS FOR OBSERVATION OF A ON DISPLAY SCREEN

FIELD OF THE INVENTION

The present invention relates to a Fresnel lens, in particular, to a Fresnel lens adapted to be placed in front of a display screen of a computer or a television set in order to magnify images displayed thereon for observation.

PRIOR ART

A conventional Fresnel lens has a cross sectional view shown in FIG. 1. That is, a plurality of annular prism elements Li is coaxially arranged with respect to the optical axis O at a predetermined pitch. The top surface of the annular prism element Li is inclined by an angle $\theta_i$ with respect to the horizontal plane so that said surface forms a part of a spherical surface having a radius of curvature corresponding to the focal distance "f" of the Fresnel lens. When the height of the annular prism element apart from the optical axis O by a distance $h_i$ is represented by $d_i$ the smaller $h_i$ makes the smaller $d_i$. A flat circular area having an extremely small diameter is formed on a central part around the optical axis O.

In a Fresnel lens attached before a display screen of a computer or the like in order to magnify images for observation, annular prism elements are arranged at an extremely small pitch in order to prevent Moire fringes from appearing. When a Fresnel lens having annular prism elements arranged at such a small pitch is attached before a display screen, a rainbow-like pattern tends to appear in a specific region of the central part around the optical axis. This rainbow-like pattern distinctively appears when the pitch in arranging the annular prism elements as constituent elements of the Fresnel lens is equal to or less than 0.25 mm. Such a rainbow-like pattern is believed to be produced due to a kind of structure of diffraction grating formed by the fine pitch in arranging the annular prism elements of the Fresnel lens.

OBJECTS AND SUMMARY OF THE INVENTION

The object of the present invention is to provide a Fresnel lens, placed in front of a display screen of a computer or a television set in order to magnify images displayed thereon for observation, which does not cause the rainbow-like pattern to be produced even when the annular prism elements of the Fresnel lens as the constituent element of said Fresnel lens are arranged at a fine pitch.

In the present invention, to solve the problem described above, there is formed a spherical surface having a radius of curvature corresponding to the focal distance of a Fresnel lens formed by annular prism elements of a Fresnel lens within a circular area defined by a predetermined radius around the optical axis, where the rainbow-like pattern would otherwise appear due to diffraction. In the present invention, the predetermined pitch in arranging a plurality of annular prism elements of the Fresnel lens is equal to or less than 0.25 mm and the height of the annular prism elements in said circular area is equal to or less than 5 $\mu$m, preferably equal to or less than 7 $\mu$m. Further, in a specific aspect of the present invention, the Fresnel lens has the focal distance of 500 mm.

For a typical Fresnel lens of FIG. 1 having the focal distance of 500 mm, relationships between the prism angle $\theta_i$ and the prism height $d_i$ for various pitches in arranging prism elements are shown in Table 2. According to the results of the experimental verification conducted by the inventor, the diffraction causing the rainbow-like pattern described above was observed within the range where the prism height $d_i$ is equal to or less than 7 $\mu$m under the condition that the prism elements are arranged at a pitch equal to or less than 0.25 mm, and it was found that a practically disturbing effect appeared in the range where the prism height $d_i$ was equal to or less than 5 $\mu$m.

Therefore, a Fresnel lens according to the present invention prevents this diffraction and thereby prevents the rainbow-like pattern from appearing by forming a spherical surface having a radius of curvature corresponding to the focal distance of lens formed by said annular prism elements within a circular area defined by a predetermined radius around the optical axis of the Fresnel lens. In a Fresnel lens having the focal distance of 500 mm, for example, when the prism elements are arranged at a pitch of 0.25 mm, the prism element height $d_i$ is equal to or less than 7 $\mu$m within the circular area defined by the diameter of 14 mm around the optical axis.

BRIEF DESCRIPTION OF THE DRAWINGS

FIG. 2 is a table showing a relationship between the arrangement pitch, the prism angle, and the prism height of the prism elements for a Fresnel lens having the focal distance of 500 mm.

DESCRIPTION OF THE PREFERRED EMBODIMENTS

Figure 1:
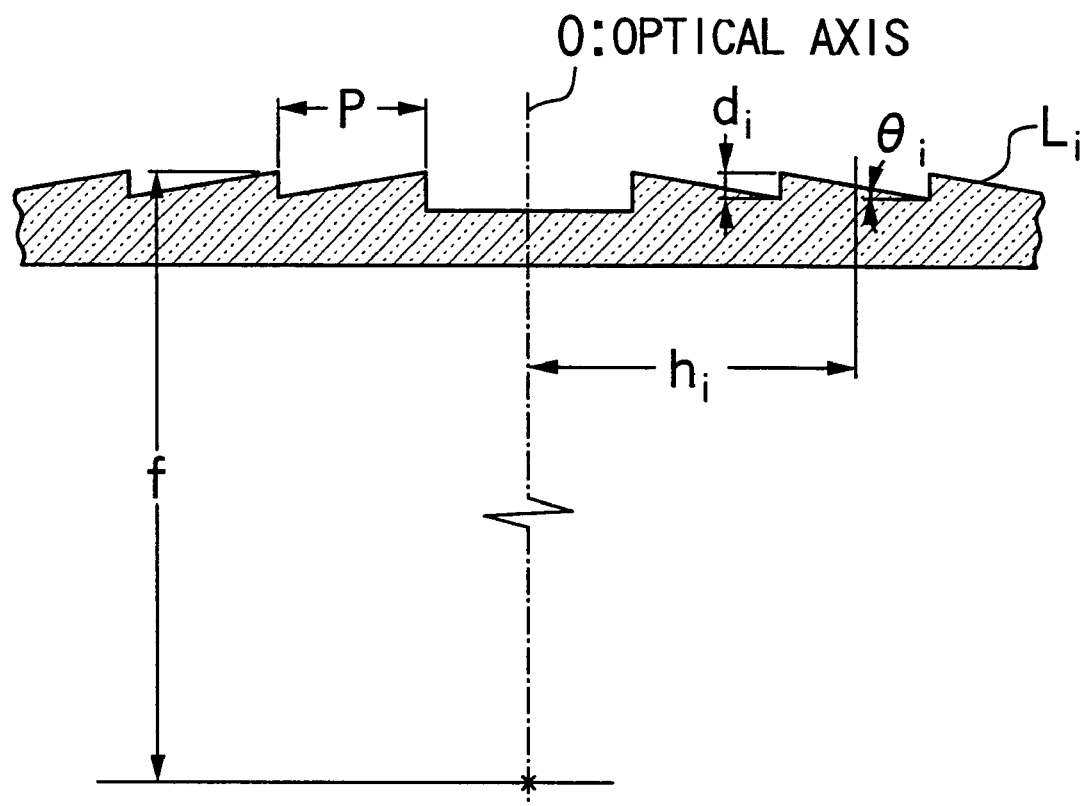
FIG. 1 is a cross sectional view of an example of a Fresnel lens having a structure according to the prior art.
Figure 3:
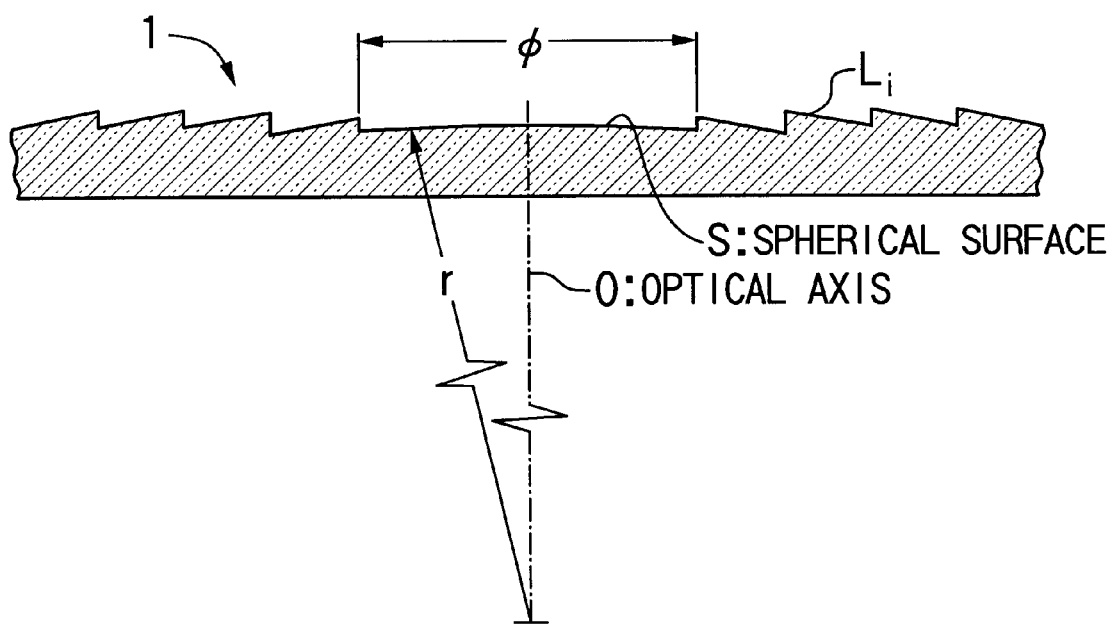
FIG. 3 is a cross sectional view of an embodiment of a Fresnel lens according to the present invention.

Referring to FIG. 3, the structure of a concrete embodiment of the present invention will be described. A Fresnel lens according to the present invention has a plurality of annular prism elements Li coaxially arranged with respect to the optical axis O. The pitch at which the prism elements Li are arranged is so fine that a rainbow-like pattern due to diffraction appears in a circular area defined by a certain diameter around the optical axis if left as it is. A Fresnel lens has on its central part, within a circular area defined by a predetermined diameter $\phi$ around the optical axis O, a spherical surface S having a radius of curvature corresponding to the focal distance "r" of said Fresnel lens. The diameter $\phi$ of this circular area where this spherical surface S is formed is much greater than the that of the central flat part of the conventional Fresnel lens shown in FIG. 1. More specifically, this spherical surface S is formed so as to cover the area where the diffraction causes the rainbow-like pattern would be produced in a structure of the Fresnel lens according to the prior art. Particularly, the spherical surface S is formed within the area where the height "$d_i$" of the prism elements Li of the Fresnel lens is equal to or less than 7 $\mu$m.

As for the example of specific numerical values, in a Fresnel lens with the focal distance of 500 mm when the prism elements Li are arranged at the pitch of 0.25 mm, the height $d_i$ of the prism elements Li within the circular area defined by the diameter of 14 mm around the optical axis O is equal to or less than 7 $\mu$m. Further, when the prism elements Li are arranged at the pitch of 0.20 mm, the area is equal to that defined by the diameter of 17.5 mm. Further, when the respective arrangement pitches of these prism elements Li are 0.15 mm, 0.10 mm and 0.05 mm, the respective areas are equal to those defined by respective approximate diameters of 23 mm, 34 mm and 70 mm. The radius "r" of curvature for the spherical surface S corresponding to the focal distance of 500 mm is about 246 mm, when the refraction factor of the material composing the Fresnel lens is 1.492. When the focal distance of the Fresnel lens is to be changed, the angle $\theta_i$ of the prism element shall be changed and consequently the diameter defining the circular area where the height "$d_i$" is equal to or less than 7 $\mu$m shall also be changed. Therefore, the spherical surface S shall be formed in an area of a different diameters. The area, where the height "$d_i$" of the prism element Li is equal to or less than 5 $\mu$m and there occurs no practically disturbing effect, is therefore reduced compared with that for the case of 7 $\mu$m.

What is claimed is:

1. A Fresnel lens for magnifying an image on a display screen to be observed, said Fresnel lens configured to have a desired focal distance by a plurality of annular prism elements coaxially arranged with respect to the optical axis with a pitch not greater than 0.25 mm, said Fresnel lens having a spherical surface having a radius of curvature corresponding to said focal distance of said lens formed by said annular prism elements in a circular area defined by a predetermined radius around said optical axis, where a rainbow-like pattern would otherwise appear due to diffraction.

2. A Fresnel lens in accordance with claim 1, in which the height of said annular prism elements in said circular area is equal to or less than 5 $\mu$m.

3. A Fresnel lens in accordance with claim 1, in which the height of said annular prism elements in said circular area is equal to or less than 7 $\mu$m.

4. A Fresnel lens in accordance with claim 2, in which said focal distance is 500 mm.

5. A Fresnel lens in accordance with claim 3, in which said focal distance is 500 mm.

* * * * *